UNITED STATES PATENT OFFICE 2,653,122

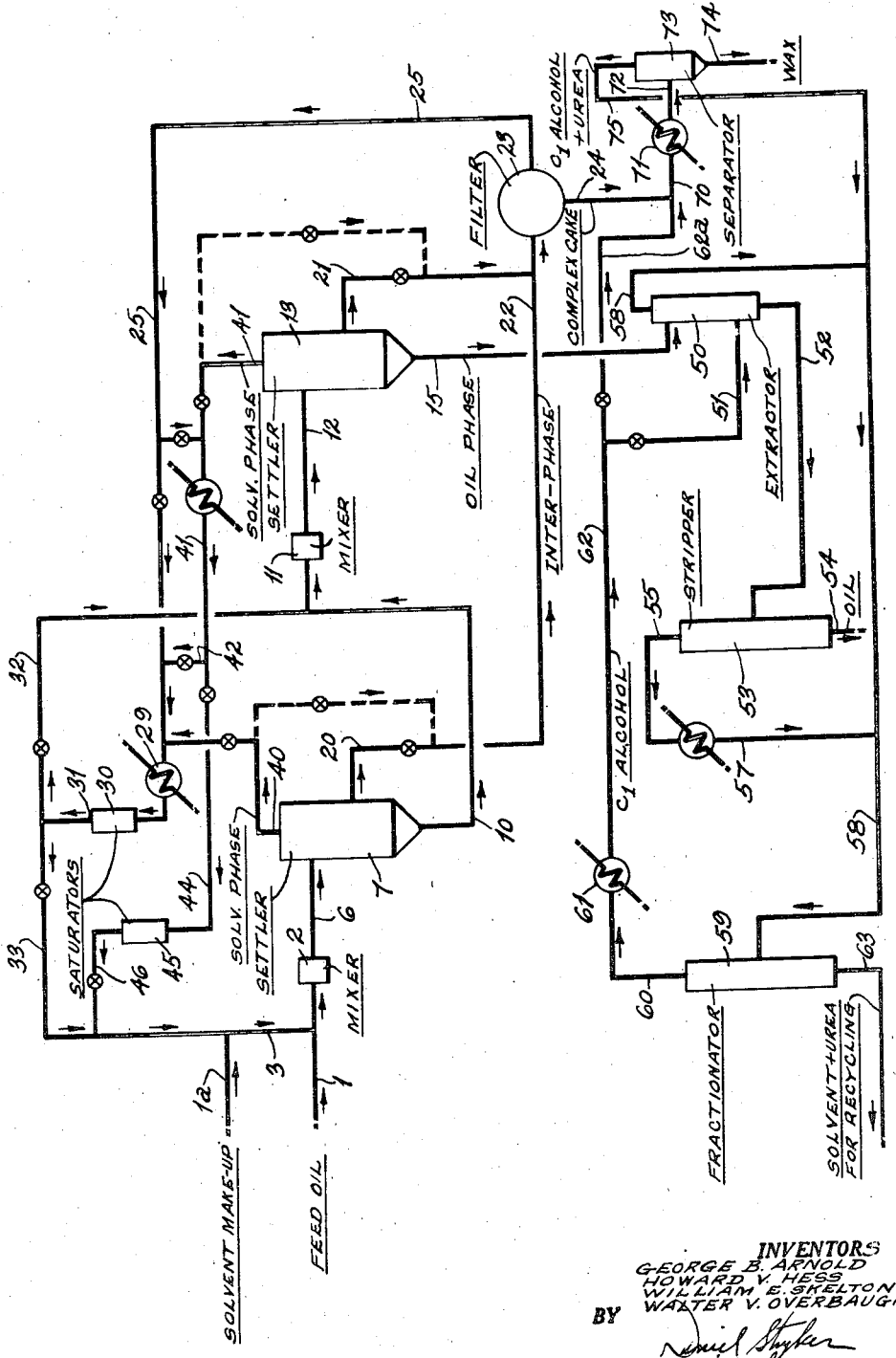

FRACTIONAL SEPARATION OF OIL WITH A COMPLEXING AGENT SUCH AS UREA IN THE PRESENCE OF A SOLVENT LIQUID

George B. Arnold, Glenham, and Howard V. Hess and William E. Skelton, Beacon, and Walter V. Overbaugh, Fishkill, N. Y., assignors to The Texas Company, New York, N. Y., a corporation of Delaware Application December 22, 1948, Serial No. 66,664

3 Claims. (Cl. 196—17)

This invention relates to the treatment of oil such as hydrocarbon mixtures and the like to effect separation therefrom of constituents which, under suitable conditions in the presence of a complexing agent such as urea and a solvent liquid, form complexes which are separable from the mixture undergoing treatment.

The invention broadly contemplates subjecting the feed mixture to contact with a complexing agent such as urea in the presence of a solvent liquid such as a low molecular weight aliphatic alcohol which is at least partially miscible with the agent and which is essentially immiscible with the oil. Contact is effected in a series of contact stages, each comprising mixing and settling zones, forming in each stage solvent-rich and oil-rich liquid phases, respectively, the solvent-rich phase being relatively rich in complexed constituents as solid complex and the oil-rich phase being relatively lean in said constituents. These phases are separately withdrawn from each settling zone, the oil-rich phase withdrawn from a preceding stage being conducted to its succeeding stage. The oil-rich phase discharged from the final settling zone is removed and further treated to recover therefrom a desired oil product.

Solvent-rich phase removed from the final settling stage may be recycled to the initial contacting stage, while solvent-rich phase withdrawn from the initial stage may be discharged for further treatment in order to remove the complexed constituents therefrom. The residual solvent and complexing agent from which the complexed constituents of the feed oil have been removed are recycled to the system.

According to a preferred modification, the operation is carried out so as to form three phases or layers in each settling zone. In this type of operation, oil-rich layers and solvent-rich layers, respectively, are obtained and in addition an interphase layer in which the solid complex is concentrated is obtained. The interphase material resides at the bottom of the solvent-rich phase. The interphase material is continuously drawn off from each settling stage and conducted to a separating unit wherein the complexed material is removed from the liquid associated therein, the liquid being returned to the system as will be described in the more detail with reference to the accompanying drawing.

In a companion application Serial No. 64,272 filed December 9, 1948, now U. S. Patent No. 2,637,681, for Fractional Separation of Oil With an Organic Complexing Agent in the Presence of a Solvent Liquid, an operation is disclosed involving employment of a continuous countercurrent flow contacting column. The method of the present invention concerns the employment of a series of separate contacting stages and advantageously having provision for the formation of two liquid layers and an interphase layer of solids in the settling zone of each stage, as already mentioned.

The invention has application to the dewaxing of mineral oil or fractions thereof and also to the deoiling of wax concentrates or fractions thereof. It may be applied to the treatment of oils derived from animal and vegetable sources for the purpose of separating oxygen-containing compounds therefrom.

The invention is particularly effective for removing wax from relatively low boiling hydrocarbon oil fractions for the production of refrigerator oils characterized by having an extremely low pour point and freedom from wax cloud or haze in Freon 12 solution at temperatures as low as minus 70° F. Likewise, it is applicable to the dewaxing of gas oils for the production of diesel oil.

It is contemplated that organic agents other than urea may be employed and which have the structure:

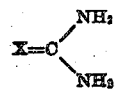

where X may be oxygen or sulfur. Thiourea and urea are examples.

Suitable solvents are polar compounds and comprise alcohols, either aliphatic or cyclic, ketones, glycols, amines, esters, dioxane, aniline, etc. Aliphatic alcohols having from 1 to 5 or more carbon atoms per molecule and particularly normal and isopropyl alcohols are useful solvents. Either straight chain or branched chain alcohols may be employed; also alcohols diluted with water or with other modifying agents.

In order to describe the method of operation in more detail, reference will now be made to the flow diagram of the accompanying drawing, illustrating a method of operation for the manufacture of a refrigerator oil, charging a lubricating oil distillate having a Saybolt Universal viscosity of 300 seconds at 100° F. containing about 1.0 per cent wax by volume and having a pour test of minus 25° F.

The charge oil is obtained from a source not shown and conducted through a pipe 1 to a mixer 2. Advantageously, a stream of solvent such as isopropyl alcohol at least saturated with a complexing agent, such as urea, is conducted through pipe 3 from a source referred to later and injected into the feed oil stream flowing through pipe 1 to the mixer 2. If desired, however, the solvent saturated with urea may be conducted directly to the mixer.

The mixing is effected at a temperature of about 100° F. and the resulting mixture conducted through a pipe 6 to a settler 7 maintained at a temperature of about 100° F. Temperatures ranging from normal room temperature to about 150° F. may be used.

According to the preferred mode of operation, conditions are maintained so that stratification into three layers occurs. The bottom layer comprises mainly oil mixed with a small amount of isopropyl alcohol, the alcohol being saturated with urea. The top layer collecting in the settler 7 is a solvent-rich layer comprising mainly isopropyl alcohol substantially saturated with urea, while the interphase layer relatively small in proportion to the other two layers, consists essentially of solid complex between wax and urea associated with some solvent and oil.

A stream of oil-rich liquid is drawn off from the bottom of the settler through pipe 10 and conducted to a mixer 11 wherein it is mixed with the stream of isopropyl alcohol containing urea in excess of that required to saturate the alcohol at the temperature prevailing in the contacting stages. From the mixer 11 the resulting mixture flows through pipe 12 to a settler 13, likewise maintained at a temperature of about 100° F.

Operations in this settler are similar to those in settler 7 so that the formation of three layers occurs. The oil-rich phase formed in settler 13 is continuously drawn off through pipe 15 and discharged for further treatment, as will be described later.

The interphase liquids collecting in both settlers 7 and 13 are drawn off through pipes 20 and 21, respectively, which pipes lead to a common pipe 22 by which the interphase liquid is conducted to a filter 23.

By means of the filter 23, the complex material, which is in crystalline or solid form, is filtered out of the associated oil and alcohol. The complex in the form of filter cake is discharged through conduit 24 for further treatment, as will be described.

The filter may be a conventional rotary drum vacuum filter having provision for washing of the filter cake in situ with additional alcohol or, for that matter, with some other suitable wash solvent, such as benzene, to permit obtaining a washed filter cake of complexes which is substantially free from adhering oil.

Instead of filtration, it is contemplated that other separating means may be utilized, such as centrifuging or thickening in a conventional thickener.

The filtrate is drawn off through pipe 25 and can be conducted through a vessel 30 containing urea in solid particle or lump form. The filtrate stream flows through the vessel 30 in direct contact with solid urea, effecting some solution thereof. The extent of solution is regulated by the temperature maintained. Thus, the filtrate stream flowing through pipe 25 can be heated to any desired extent in a heat exchanger 29. For example, it may be heated to a temperature of about 125° F.

While the single vessel 30 is shown, it will be understood that two or more such vessels may be arranged in parallel so that one vessel may be charged, while the other is on stream.

The effluent stream of solvent saturated with urea at about 125° F. is conducted through a pipe 31. This stream may be diverted in part through branch pipe 32 leading to the mixer 11. Another portion may be diverted through pipe 33 leading to the mixer 2.

The solvent-rich liquids accumulating in the settlers 7 and 13 are drawn off through pipes 40 and 41, respectively. Pipe 40 communicates with pipe 25, previously referred to, while pipe 41 may connect with a branch pipe 42 and also with pipe 25. In this way, the solvent-rich streams from both settling zones may be conducted through the saturating vessel 30 and thereafter returned to the contacting zones.

Referring now to the oil phase liquid discharged through pipe 15 from settler 13: this stream is conducted to an extractor 50 wherein it is subjected to countercurrent washing with a stream of methyl alcohol introduced to the lower portion of the extractor 50 through pipe 51. This washing can be effected at a temperature of about 100° F. and effects removal of residual urea retained in the oil and isopropyl alcohol flowing into the extractor from pipe 15, since urea is substantially more soluble in methyl alcohol than in isopropyl alcohol.

The washed oil and isopropyl alcohol are discharged through pipe 52 into a stripper 53 wherein the isopropyl alcohol and any residual methyl alcohol are distilled from the oil as a distillate.

The solvent-free oil is discharged through pipe 54, while the aforesaid distillate is discharged through pipe 55, condenser 56 and pipe 57, connecting with a pipe 58 leading to a fractionator 59.

In the fractionator 59 the methyl alcohol is distilled from the isopropyl alcohol, the distillate being removed through pipe 60, condenser 61 and pipe 62. Part of the resulting condensate in pipe 62 provides the wash solvent flowing through pipe 51 to the extractor 50.

The isopropyl alcohol which may still retain a small amount of urea is discharged from the fractionator through pipe 63 for return to the contacting system at any point desired. Thus, it may be used as solvent make-up entering the system through the pipe 1A.

Another portion of the methyl alcohol condensate from pipe 62 may be conducted through pipe 62A and injected into the filter cake discharged through pipe 24. This mixture flows through pipe 70 and a heater 71 wherein it may be heated to a temperature of about 180° F. From the heater 71 it flows through pipe 72 to a separator 73 wherein stratification occurs forming a methyl alcohol layer containing urea broken from the wax and a wax layer substantially free from alcohol and urea.

The wax is discharged through pipe 74, while the alcohol and urea solution is drawn off through pipe 75 which communicates with the previously mentioned pipe 58 leading to the fractionator 59.

The wash solution of methyl alcohol containing urea removed from the oil in the extractor 50 is conducted through a pipe 76 also communicating with the pipe 58.

According to a modified type of operation, conditions may be adjusted so that only two phases are withdrawn from the settlers of each contacting stage, namely, an oil-rich layer and a solvent-rich layer containing the complexed material. In this case, the pipes 20 and 21 are blocked off and the solvent-rich layers containing the complexed material are drawn off through pipes 40 and 41, and each stream may be conducted in toto through the by passes indicated by the broken lines communicating with pipe 22 and thus conducted directly to the filter 23.

According to another modification the solvent-rich phase removed from the settler 40 may be conducted to the succeeding mixer 11, while the solvent-rich layer from the settler 13 may be recycled to the mixer 2. Thus the solvent-rich liquid from settler 7 flows through pipe 40, heater 29, saturating vessel 30 and pipe 32 to the mixer 11. Solvent-rich liquid from settler 13 flows through pipe 41, heat exchanger 43, pipe 44 to a saturating vessel 45, similar to the vessel 30 already referred to. From the vessel 45, the liquid flows through pipe 46 into pipe 3 to the mixer 2. In this latter type of operation the solvent-rich phases drawn off through pipes 40 and 41 may or may not contain the bulk of the complexed material elsewhere described as being removed as interphase material.

By way of example and when operating so as to remove three separate phases or layers from each settling stage, the 300 viscosity feed oil is charged to the mixer 2 at the rate of 350 barrels per day. In this mixer it is mixed with about 3 volumes of alcohol-rich liquid per volume of feed oil, the alcohol-rich liquid comprising about 68.9% isopropyl alcohol, 27.4% oil and 3.7% urea, introduced from the pipe 3.

The interphase liquid removed through pipe 20 from the settler 7 amounts to about 0.5 volume per volume of feed oil. A similar quantity of this material is withdrawn from settler 13 through pipe 21. The volume of oil-rich phase removed from settler 7 through pipe 10 amounts to about 1.4 volumes per volume of feed oil, and it is mixed in the mixer 11 with about 2 volumes of solvent-rich liquid, similar in composition to that used for mixing with the fresh feed oil in mixer 2.

The oil-rich liquid discharged from settler 13 through pipe 15 amounts to about 450 barrels, of which about 346 barrels are wax-free oil having a pour test of −25° F. and a "Freon Cloud" of about −65 to −75° F., as compared with above −22° F. for the feed oil.

The interphase material is drawn off through pipes 20 and 21 to the filter 23 and is filtered to produce about 20 barrels of complex and a filtrate amounting to about 1.14 volumes per volume of feed oil, this filtrate consisting of approximately 68% alcohol, 27.5% oil and 3.6% urea.

The aforesaid "Freon Cloud" is determined by mixing the oil with Freon 12 in the proportion of about 90% Freon and 10% oil, chilling the mixture, and observing the point at which wax haze appears.

The oil discharged from the stripper 53 through pipe 54 may be subjected to washing with water and then dried by passage through a conventional drier or blotter press to produce a finished refrigerator oil.

In the event of there being a substantial amount of oil retained in the interphase or complexed material, it may be subjected to washing or repulping with a suitable oil solvent, such as benzene or other benzenoid hydrocarbons. The repulped mixture can be subjected to settling, centrifuging or filtration, etc. to obtain an oil-free complex which can then be decomposed to yield substantially oil-free wax.

If desired, the withdrawn interphase layer can be subjected to continuous countercurrent flow washing with a low molecular weight hydrocarbon such as normal or isobutane, normal or isopentane, etc., to extract the retained oil. The wash solution is removed and separately distilled to separate the low molecular weight hydrocarbon from the recovered oil, the former being recycled for washing further interphase material.

The washed or oil-free complex can be decomposed by washing with hot solvent, as already described, or can be decomposed merely by heating or by the addition of water with or without heating.

The oil-rich liquid drawn off from the bottom of the settling zones can be subjected to distillation to remove retained solvent and amide from the dewaxed oil.

While reference to the treatment of a refrigerator type of lubricating oil has been specifically described, nevertheless the process has application to the treatment of other types of lubricating oil, including wax distillates and residual cylinder stocks. If desired, these relatively more viscous feed oils may be diluted with aromatic hydrocarbons, such as benzene, toluene, xylene or mixtures thereof, prior to introduction to the mixer 2 in order to facilitate effective contact between the feed oil and the urea-saturated alcohol. The diluent may be a petroleum naphtha or naphtha hydrocarbon mixture or a low boiling hydrocarbon having from 3 to 5 or more carbon atoms per molecule.

The use of the diluent is advantageous in the event that it is desired to subject either the solvent-rich phase or the oil-rich phase removed from the settler 13 to a subsequent filtration. The oil-rich phase may under certain conditions retain a substantial amount of complex or crystallized material, and dilution with a low molecular weight hydrocarbon solvent may be advantageous in order to effect removal of the crystalline material by filtration.

Likewise, it may be desirable to subject the complex removed from the settlers to filtering in which case the complex may be diluted with a low molecular weight hydrocarbon or an aromatic hydrocarbon, such as benzene, to dissolve the small amount of retained oil and facilitate its removal by filtration.

The process of this invention may be applied to the removal of residual wax from a wax-bearing oil that has previously been subjected to dewaxing by conventional filtration or centrifuging in the presence of a diluent or solvent at low temperature and thus effect a further reduction in the pour point of the oil. On the other hand, the process of this invention may be used to effect a preliminary removal of wax prior to conventional dewaxing. The wax-oil feed in the process of this invention may be a mixture of relatively wide boiling range or may be a mixture of relatively narrow boiling range, such as the individual fractions obtained by fractional distillation of a wax distillate.

Simultaneous removal of wax and resinous or asphaltic material may be effected by suitable selection of solvents or diluent liquids. For example, a high molecular weight aliphatic alcohol, such as amyl, may be employed where it is desired to effect precipitation of resinous and asphaltic constituents from the oil, such precipitated constituents being removed along with the complexed material.

Although separation of waxy hydrocarbons from hydrocarbon mixtures has been mentioned specifically, it is contemplated that other constituents capable of complexing with the urea or other agent may be removed. Normal olefins and also aromatic and naphthenic compounds having long aliphatic side chains enter into complex formation with urea and thus can be separated in this way from hydrocarbon mixtures containing them. It is contemplated that certain derivatives of urea, such as the substituted ureas, may be employed, for example, ethanol urea, diethyl urea, and butyl urea.

Mention has been made of decomposing the complex wax cake with methyl alcohol, but if desired, hot isopropyl alcohol may be used. For example, the oil-rich phase discharged from the process may be subjected to distillation to strip residual solvent and amide therefrom and this hot distillate may be used for decomposing the associated complex cake.

Obviously many modifications and variations of the invention, as hereinbefore set forth, may be made without departing from the spirit and scope thereof, and therefore only such limitations should be imposed as are indicated in the appended claims.

We claim:

1. A continuous method of treating hydrocarbon oil containing constituents which form crystalline complexes with an organic compound having the structure:

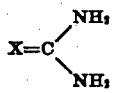

where X is selected from the group consisting of oxygen and sulfur, and wherein the oil is subjected to contact with said compound in the presence of C₃ aliphatic alcohol in a series of treating stages each comprising mixing and settling zones, the method comprising forming a first mixture of said oil with recycle solvent liquid and oil, as later defined, said recycle solvent and oil containing said complexing compound, the volume of alcohol contained in said resulting mixture being large relative to the volume of feed oil, subjecting the resulting mixture to settling in a settling zone at a temperature in the range of about 70 to 150° F., forming in said settling zone a solvent-rich liquid layer, an oil-rich liquid layer and an inter-phase layer rich in complexed constituents, separately withdrawing a stream of each layer, conducting withdrawn oil-rich liquid to a succeeding stage, forming with said withdrawn oil-rich liquid a second mixture with a further quantity of said recycle solvent and oil containing complexing compound the volume of alcohol in the resulting second mixture being large relative to the volume of oil therein, subjecting this second mixture to settling in a second settling zone at a temperature in the range of about 70 to 150° F., forming in the second settling zone a solvent-rich liquid layer, an oil-rich liquid layer and an inter-phase layer rich in complexed constituents, separately withdrawing a stream of each layer, discharging oil-rich liquid withdrawn from said last mentioned settling zone, commingling inter-phase layers withdrawn from both settling zones, filtering the complexed constituents from the commingled mixture to form a recycle oil-rich stream substantially free from complex, commingling solvent-rich streams withdrawn from said settling zones with said complex-free recycle oil stream, incorporating complexing compound in the resulting recycle stream mixture to form the aforesaid recycle solvent liquid and oil, and supplying make-up alcohol to the initial mixing zone to maintain the alcohol requirement for the system.

2. A continuous method of separating wax from mineral oil by subjecting said oil to contact with an organic compound having the structure:

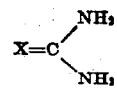

where X is selected from the group consisting of oxygen and sulfur, and wherein the oil is subjected to contact with said compound in the presence of C₃ aliphatic alcohol in a series of treating stages each comprising mixing and settling zones, the method comprising forming a first mixture of said mineral oil with recycle solvent liquid and oil, as later defined, said recycle solvent and oil containing said complexing compound, the volume of alcohol in said resulting first mixture being large relative to the volume of feed oil, subjecting the resulting mixture to settling in a settling zone at a temperature in the range of about 70 to 150° F., forming in said settling zone a solvent-rich liquid layer, an oil-rich liquid layer and an inter-phase layer rich in complexed wax constituents, separately withdrawing a stream of each layer, conducting withdrawn oil-rich liquid to a succeeding stage, forming with said withdrawn oil-rich liquid a second mixture with a further quantity of said recycle solvent and oil containing complexing compound, the volume of alcohol in the resulting second mixture being large relative to the volume of oil therein, subjecting this second mixture to settling in a second settling zone at a temperature in the range of about 70 to 150° F., forming in the second settling zone a solvent-rich liquid layer, an oil-rich liquid layer and an inter-phase layer rich in complexed wax constituents, separately withdrawing a stream of each layer, discharging oil-rich liquid withdrawn from said last mentioned settling zone, commingling inter-phase layers withdrawn from both settling zones, filtering the complexed wax constituents from the commingled mixture to form a recycle oil-rich stream substantially free from complex, commingling solvent-rich streams withdrawn from said settling zones with said complex-free recycle oil stream, incorporating complexing compound in the resulting recycle stream mixture to form the aforesaid recycle solvent liquid and oil, and supplying make-up alcohol to the initial mixing zone to maintain the alcohol requirement for the system.

3. A continuous method of separating wax from mineral oil by subjecting said oil to contact with an organic compound having the structure:

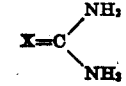

where X is selected from the group consisting of oxygen and sulfur, and wherein the oil is subjected to contact with said compound in the presence of an aliphatic alcohol having from 1 to 5 carbon atoms per molecule in a series of treating stages each comprising mixing and settling zones, the method comprising forming a first mixture of said mineral oil with recycle solvent liquid and oil, as later defined, said recycle solvent and oil containing said complexing compound, the volume of alcohol contained in said resulting first mixture being large relative to the volume of said oil, subjecting the resulting mixture to settling in a settling zone at a temperature in the range of about 100° F., forming in said settling zone a solvent-rich liquid layer, an oil-rich liquid layer and an inter-phase layer rich in complexed wax constituents, separately withdrawing a stream of each layer, conducting withdrawn oil-rich liquid to a succeeding stage, forming with said withdrawn oil-rich liquid a second mixture with a further quantity of said recycle solvent and oil containing complexing compound, the volume of alcohol in the resulting second mixture being large relative to the volume of oil therein, subjecting this second mixture to settling in a second settling zone at a temperature in the range of about 100° F., forming in the second settling zone a solvent-rich liquid layer, an oil-rich liquid layer and an inter-phase layer rich in complexed wax constituents, separately withdrawing a stream of each layer, discharging oil-rich liquid withdrawn from said last mentioned settling zone, commingling inter-phase layers withdrawn from both settling zones, filtering the complexed constituents from the commingled mixture to form a recycle oil-rich stream substantially free from complex, commingling solvent-rich streams withdrawn from said settling zones with said complex-free recycle oil stream, incorporating complexing compound in the resulting recycle stream mixture at a temperature of about 125° F. to form the aforesaid recycle solvent liquid and oil, and supplying make-up alcohol to the initial mixing zone to maintain the alcohol requirement for the system.

GEORGE B. ARNOLD.
HOWARD V. HESS.
WILLIAM E. SKELTON.
WALTER V. OVERBAUGH.

References Cited in the file of this patent

UNITED STATES PATENTS

| Number | Name | Date |
|---|---|---|
| 2,151,529 | Roberts | Mar. 21, 1939 |
| 2,234,916 | Jones | Mar. 11, 1941 |
| 2,301,965 | Mauro et al. | Nov. 17, 1942 |
| 2,499,820 | Fetterly | Mar. 7, 1950 |
| 2,520,715 | Fetterly | Aug. 29, 1950 |

OTHER REFERENCES

U. S. Technical Mission, Reel 143, translation by Shell Development Company, of German application B 190,197 (Bengen), May 22, 1946 (5 pages, pages 2-6 inclusive only) (included in Index released May 31, 1946).